United States Patent
Strasser et al.

[19]

[11] Patent Number: 5,910,095
[45] Date of Patent: Jun. 8, 1999

[54] FIBER REINFORCED CERAMIC MATRIX COMPOSITE MARINE ENGINE RISER ELBOW

[75] Inventors: Thomas Edward Strasser, Corona; Steven Donald Atmur, Riverside, both of Calif.

[73] Assignee: Northrop Grumman Corporation, Los Angeles, Calif.

[21] Appl. No.: 08/804,451

[22] Filed: Feb. 21, 1997

[51] Int. Cl.⁶ .................................................... F01N 1/00
[52] U.S. Cl. ................... 60/272; 264/86; 60/310; 428/297
[58] Field of Search .................. 60/272, 274, 323, 60/310; 264/86; 428/367, 364; 181/235

[56] References Cited

U.S. PATENT DOCUMENTS

| | | |
|---|---|---|
| 4,222,360 | 9/1980 | Fujikawa et al. . |
| 4,601,264 | 7/1986 | Hirano . |
| 4,921,657 | 5/1990 | Rabe et al. ................................. 264/86 |
| 5,052,463 | 10/1991 | Lechner et al. ........................... 164/35 |
| 5,135,809 | 8/1992 | Rabe et al. ................................ 428/367 |
| 5,391,428 | 2/1995 | Zender .................................... 428/297 |
| 5,439,627 | 8/1995 | De Jager ................................. 264/129 |
| 5,729,970 | 3/1998 | Atmur et al. ............................... 60/272 |

*Primary Examiner*—Thomas E. Denion
*Attorney, Agent, or Firm*—Terry J. Anderson; Karl J. Hoch, Jr.

[57] ABSTRACT

A corrosion-resistant, thermally insulative riser elbow for a marine engine. The riser elbow has an exhaust gas conduit made of fiber reinforced ceramic matrix composite (FRCMC) material formed from a polymer-derived ceramic resin in its ceramic state and fibers. Employing a FRCMC material results in a low-cost, light-weight, corrosion-resistant exhaust gas conduit not available with existing riser elbows. In addition, a FRCMC exhaust gas conduit is thermally insulative and so more of the heat of the exhaust is retained rather than being transferred to the conduit. This allows the cooling requirements for the riser elbow to be lowered, while still maintaining a touch temperature below prescribed levels. FRCMC can also be formed into practically any shape and size desired and can be very ductile thereby making the exhaust gas conduit fracture resistant and capable of withstanding thermally-induced strains typical of the environment of a marine engine's exhaust system. The riser elbow also includes a water jacket sleeve formed integrally with and surrounding the exhaust gas conduit so as to define a cooling water channel between the outer wall of the exhaust gas conduit and the inner wall of the water jacket sleeve. Preferably, a plastic material capable of withstanding long-term exposure to at least 250 degree Fahrenheit cooling water, which can be salt water, without structural degradation is employed to form the water jacket sleeve. In addition, the plastic material should have a sufficient ductility to withstand handling and thermally-induced strains associated with the riser elbow of a marine engine.

31 Claims, 3 Drawing Sheets

FIBER REINFORCED CERAMIC MATRIX COMPOSITE MARINE ENGINE RISER ELBOW

BACKGROUND

1. Technical Field

This invention relates to riser elbows for an inboard internal combustion marine engine, and more particularly, to such riser elbows having an exhaust gas conduit section formed of a fiber reinforced ceramic matrix composite (FRCMC) material and methods for making these elbows.

2. Background Art

The exhaust from an inboard internal combustion marine engine used to power recreational and small commercial boats, as well as larger vessels, is typically cooled to prevent excessive heat buildup in the exhaust system. This cooling is necessary to protect the structure of the boat from the heat. For example, hot exhaust gases which impinge the fiberglass hull employed in many recreational boats can degrade or even burn the fiberglass. The same is true for exhaust system component heated by these gases which are adjacent the boat's hull. In addition, the temperature of the exhaust system components must be kept below the flash point of gasoline for safety reasons. U.S. Coast Guard requirements dictate that exhaust system components not exceed a prescribed touch temperature. Typically, the touch temperature of these components must be below 210 degrees Fahrenheit, or 185 degrees Fahrenheit in some cases. As a result many of the exhaust systems components of a marine engine must be cooled as well, typically using a water jacket structure of some type. In addition, the exhaust gas itself is usually cooled by injecting water into the exhaust gas stream.

FIG. 1 depicts in simplified form a typical exhaust system for a marine engine. Exhaust gas exits the exhaust manifold 12 of the engine into the exhaust gas conduit 14 of a riser elbow 16. In addition, cooling water, which is typically drawn from the surrounding body of water to cool the engine and exhaust system components, exits the a water jacket associated with the manifold 12 into the cooling water channel 18 of the riser elbow 16. The cooling water channel 18 is formed by an external sleeve 20 surrounding the exhaust gas conduit 14. The cooling water keeps the riser elbow 16 below the required touch temperature despite the exhaust gas flowing through the conduit 14. The end of the external sleeve 20 of the riser elbow is coupled to the inlet side of a flexible connector conduit 22, which is typically made of rubber tubing. The end of the exhaust gas conduit 14 opens up into the interior of the connector conduit 22. In this way, the cooling water and exhaust gas are mixed, thereby cooling the gas. The outlet side of the connector conduit 22 is coupled to the inlet of an exhaust pipe 24. This exhaust pipe 24 is typically made from stainless steel to resist the corrosive effects of the exhaust gas and cooling water mixture flowing through it. Although, not shown in FIG. 1, the exhaust gas and cooling water mixture eventually exits the boat via the outlet of the exhaust pipe 24. It is noted that no water jacket structure is required for the connector conduit 22 and exhaust pipe 24 as the mixing of the cooling water with the exhaust ensures these components remain below the required touch temperature.

The riser elbow 16 is required in the exhaust system of a marine engine to prevent the cooling water used to cool the exhaust from finding its way back into the engine. Essentially, the riser elbow 16 constitutes a high point in the exhaust system upstream of the connector conduit 22 where the cooling water is injected into the exhaust gas. This high point in the system prevents the cooling water from falling back into the engine.

The structure of the riser elbow creates some unique problems. As can be seen in FIG. 1, the hot exhaust gases make a very abrupt turn within the conduit 14 of the riser elbow. This results in direct impingement of a hot, corrosive gas on the interior surface of the conduit 14. In addition, the cooling water flowing through the cooling water channel may have corrosive effects of its own. For ocean-going vessels, this cooling water is typically raw salt water pumped directly into the engine. And finally, when the cooling water and exhaust gas is mixed in the connector conduit 22, hot, corrosive steam is produce which contacts the outlet side of the riser elbow. The aforementioned factors combine to present an extremely corrosive environment which the riser elbow must survive. Riser elbows are typically made from either cast iron or a thin-wall stainless steel casting. In the case of a cast iron elbow, the corrosive effects cause the cast iron to decay very quickly. A cast iron riser elbow may not survive more than 300–400 hours total use before the outlet end corrodes away. Additionally, a cast iron riser elbow typically has thick walls and has a considerable weight. This results in an increase in the weight of the vessel and reduces the efficiency of the engine. The use of a thin-walled stainless steel casting resolves the weight problem. In addition, stainless steel corrodes at a much slower rate than cast iron and so lessens the corrosion problem. Therefore, this type of riser elbow does not have to be replaced as often as a cast iron riser elbow. However, the thin-walled stainless steel riser elbows are considerably more expensive than the cast iron versions. Thus, the cost is high no matter which version is employed. The cast iron because of the need to replace it often, and the stainless steel because of its high initial cost.

Riser elbows made from stainless steel also present another problem. Whereas, a typical cast iron exhaust manifold and attached cast iron riser elbow expand at nearly the same rate as the engine heats up, a stainless steel riser elbow does not. A thin-walled stainless steel riser elbow expands at a significantly different rate than a cast iron exhaust manifold. This disparity in the thermal expansion rates of these two exhaust system components can result in the seal between the two being compromised resulting in exhaust gas and/or cooling water leaks.

Another problem concerning existing cast iron and stainless steel riser elbows is their high thermal conductivity. Having a high thermal conductivity results in heat from the exhaust being readily transferred through the exhaust gas conduit to the cooling water. Thus, to ensure the riser elbow remains below the prescribed touch temperature, it is necessary to flow sufficient quantities of cooling fluid to dissipate the heat. This in turn can increase the cooling water requirements over that which is required to cool the exhaust gas in the downstream exhaust system components, thereby requiring bigger water jackets and/or cooling water flow rates. These increased cooling requirements can lead to the need for larger engine components, thereby increasing the weight and lowering the efficiency of the engine.

Accordingly, there is a need for a light-weight, low cost, thermally insulative riser elbow which can withstand the corrosive environment of a marine engine exhaust system, and which has a thermal expansion coefficient closer to that of the engine's cast iron exhaust manifold.

Wherefore, it is an object of the present invention to provide a riser elbow for a marine engine which is lighter in weight than existing cast iron riser elbow, so as to reduce the overall weight of vessel and increase the efficiency of the engine.

Wherefore, it is another object of the present invention to provide a riser elbow for a marine engine which exhibits a low thermal conductivity so as to retain more heat within the exhaust gas flowing therethrough, thereby reducing the cooling requirements of the elbow while still maintaining the touch temperature below a prescribed level.

Wherefore, it is yet another object of the present invention to provide a riser elbow for a marine engine which can withstand long term exposure to the corrosive environment of the engine's exhaust system while at the same time having lower cost than comparable stainless steel riser elbows.

Wherefore, it is still another object of the present invention to provide a riser elbow for a marine engine which exhibits a thermal expansion coefficient closer to that of the engine's exhaust manifold than current stainless steel riser elbows.

SUMMARY

The above-described objectives are realized with embodiments of the present invention directed to a corrosion-resistant, thermally insulative riser elbow for a marine engine. The riser elbow has an exhaust gas conduit made of fiber reinforced ceramic matrix composite (FRCMC) material formed from a polymer-derived ceramic resin in its ceramic state and fibers. The riser elbow also includes a water jacket sleeve formed integrally with and surrounding the exhaust gas conduit so as to define a cooling water channel between the outer wall of the exhaust gas conduit and the inner wall of the water jacket sleeve. The outlet side of the water jacket sleeve terminates at a location back from the termination point of an outlet side of the exhaust gas conduit. In other words, the exhaust gas conduit to extend past the end of water jacket sleeve. This feature, along with a cooling water mixing structure formed on the outside of the exhaust gas conduit at its outlet end, ensure an adequate mixing of cooling water and exhaust gas once they exit the riser elbow into a connector conduit attached to the end of the water jacket sleeve. The exhaust gas conduit also has a flange portion at its inlet side. This flange portion has a centrally located opening which is in correspondence with an exhaust gas passageway formed in the interior of the exhaust gas conduit and interfaces with the exhaust gas outlet of the marine engine. In addition, the flange portion includes at least one peripheral opening surrounding the centrally located opening. The peripheral opening(s) are in correspondence with the cooling water channel and interfaces with a cooling water outlet of the marine engine. A support structure can also be formed within the cooling water channel to support and maintain a concentric relationship between the exhaust gas conduit and the water jacket sleeve, if desired.

Forming the exhaust gas conduit of the riser elbow of FRCMC material has significant advantages. For example, FRCMC material is essentially impervious to the corrosive environment of the marine engine's exhaust system. The hot exhaust gases, steam and possible salt water will have no effect on the FRCMC material, unlike the existing cast iron exhaust gas conduit structures. In addition, FRCMC material is considerably lighter than the existing cast iron structures. This reduces the overall weight of the engine and increase performance. A FRCMC exhaust gas conduit also has advantages over existing stainless steel structures in that the cost of the finished riser elbow can be significantly lower. Thus, employing a FRCMC material results in a low-cost, light-weight, corrosion-resistant exhaust gas conduit not available with existing riser elbows. FRCMC material also has a thermal expansion coefficient which is much closer to that of the cast iron of the exhaust manifold of the marine engine, in comparison to stainless steel structures. This results in a lower risk of leaks forming in the interface between the riser elbow and exhaust manifold as the engine heat up. FRCMC material also exhibits a much lower thermal conductivity than cast iron or stainless steel. Thus, a FRCMC exhaust gas conduit is more insulative and more of the heat of the exhaust is retained rather than being transferred to the conduit. This allows the cooling requirements of the riser elbow to be lowered, while still maintaining the elbow at a touch temperature below prescribed levels. Since the cooling requirements are not as great, the water jacket channel need not be as large, or the flow of cooling water as fast. As a result, the riser elbow can be made smaller and lighter, thereby reducing the overall weight of the engine and improving the engine's performance. FRCMC can also be formed into practically any shape and size desired. This allows a FRCMC conduit to be made in the complex shapes typical of marine engine riser elbows. And finally, FRCMC material being very ductile makes the conduit fracture resistant and capable of withstanding thermally-induced strains typical of the environment of a marine engine's exhaust system.

The polymer-derived ceramic resin used to form the FRCMC material is preferably either silicon-carboxyl resin or alumina silicate resin, and the fibers are preferably at least one of alumina, Nextel 312, Nextel 440, Nextel 510, Nextel 550, silicon nitride, silicon carbide, HPZ, graphite, carbon, and peat. The aforementioned degree of ductility caused by the fibers varies with the percentage by volume of the fibers in the FRCMC material. Preferably, there is a sufficient quantity of fibers to produce the desired degree of ductility. Specifically, the percentage by volume of the FRCMC material consisting of the fibers is within a range of about 25 to 55 percent, which will produce a degree of ductility between about 0.10 and 0.55 percent strain. In addition, the form of the fibers incorporated into the FRCMC material is either continuous or non-continuous. The form of the fibers also affects the degree of ductility exhibited, with continuous fiber configurations providing more ductility than non-continuous configurations. Preferably, the fiber form employed is chosen to, in combination with the quantity of fibers, produce the desired degree of ductility. The fibers are also preferably coated with an interface material which increases the ductility exhibited by the FRCMC material so as to facilitate producing the desire degree of ductility. Specifically, the interface material preferably includes at least one 0.1–5.0 micron thick layer of at least one of carbon, silicon nitride, silicon carbide, and boron nitride. The FRCMC material can also further incorporate a filler material which increases the thermal insulating capability of the material. Specifically, the filler material can include one or more of the following: silicon carbide, alumina, silicon nitride, silica, or other ceramic powders. The degree of thermal insulation provided by the filler material varies with the percentage by volume of the structure consisting of the filler material. Accordingly, a sufficient quantity of filler material should be incorporated to produce the desired degree of thermal insulation.

The exhaust gas conduit portion of the marine engine riser elbow of the present invention is preferably formed by an injection molding process, as it is believed this process can produce the conduit at the least cost. Once the FRCMC exhaust gas conduit is formed, the water jacket sleeve is integrally formed with and surrounds the exhaust gas conduit. This process preferably includes forming a mandrel from the exhaust gas conduit by coating it with a material which can be melted or dissolved, sometimes referred to as a melt-out or wash-out material, respectively. The melt-out or washout material coating the exhaust gas conduit is formed so as to have external dimension substantially matching the dimensions of the interior wall of the water jacket sleeve The plastic material which is to form the water jacket sleeve is injection molded around the aforementioned mandrel in a mold having a cavity corresponding to the shape of the exterior of the sleeve. Once the sleeve has been formed, the melt-out or washout material is removed by melting or dissolving it, as appropriate. It is preferred that the plastic material used to form the sleeve be capable of withstanding long-term exposure to at least 250 degree Fahrenheit salt water without structural degradation. In addition, the plastic material should have a sufficient ductility to withstand handling and thermally-induced strains associated with the riser elbow of a marine engine. Many conventional thermosetting plastics exhibit these attributes and would be appropriate for forming the water jacket sleeve.

In addition to the just described benefits, other objectives and advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 2A:
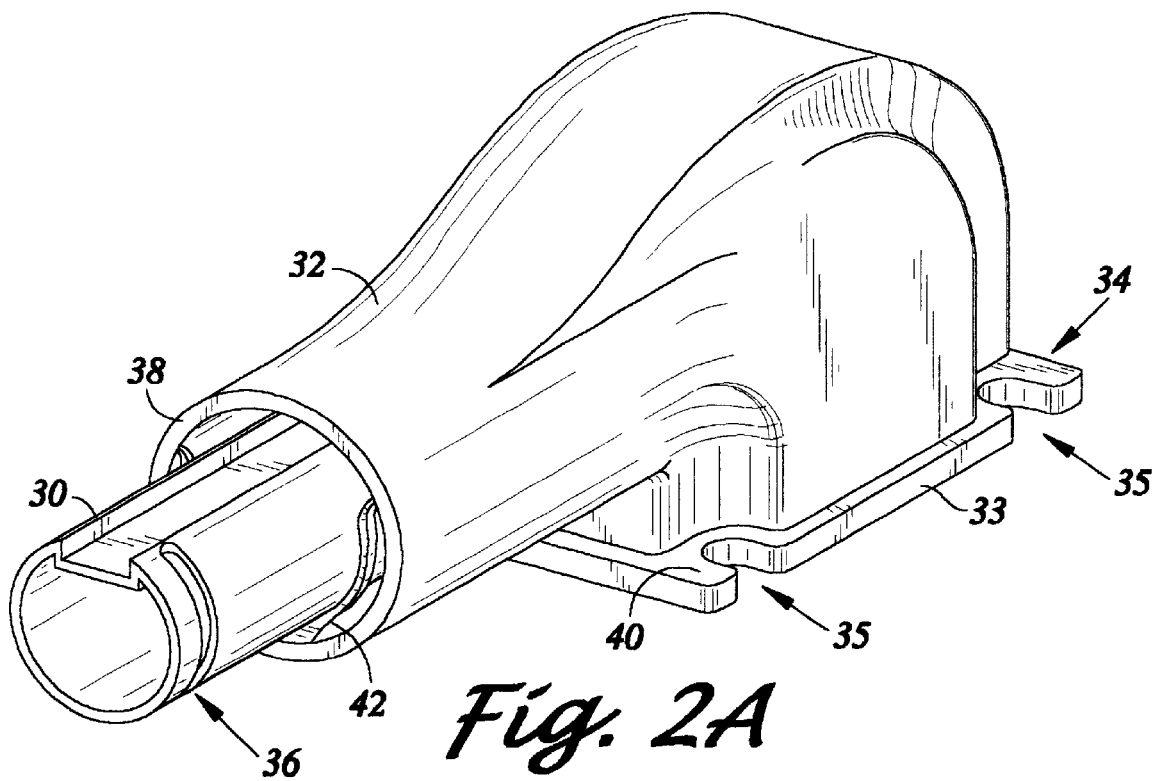
FIG. 2A is a perspective side view of a marine engine riser elbow in accordance with the present invention.
Figure 2B:
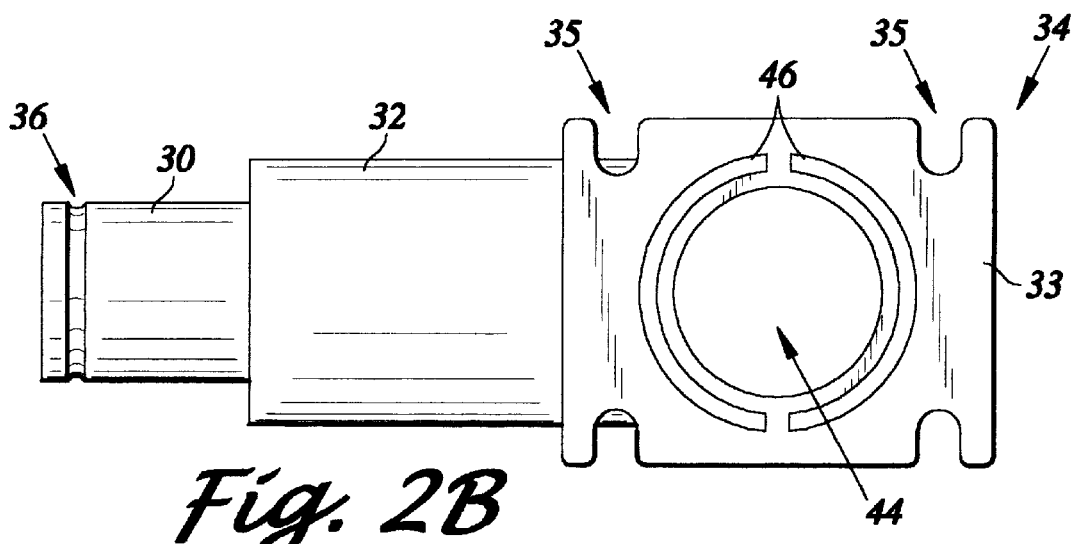
FIG. 2B is a bottom view of the riser elbow of FIG. 2A showing the structure of the flange portion of the elbow.

FIGS. 2A and 2B depicts a riser elbow constructed in accordance with the present invention. The riser elbow includes a exhaust gas conduit 30 made from a corrosion resistant fiber-reinforced ceramic matrix composite (FRCMC) material and an integrally formed water jacket sleeve 32. The exhaust gas conduit 30 includes a bottom portion 33 of a flange 34 at the inlet side of the riser elbow. The flange 34 interfaces with the exhaust manifold (not shown) of a marine engine. Preferably, the flange includes indentations 35 (or through holes if desired) to accommodate fasteners such as bolts for securing the riser elbow to the exhaust manifold of the engine. The outlet side of the conduit 30 can include a cooling water mixing structure 36, such as the one best shown in FIG. 2A. The purpose of this mixing structure 36 is to eject the cooling water from the cooling water channel 38 formed between the outer wall of the conduit 30 and inner wall of the sleeve 32, in such a way so as to thoroughly mix with the exhaust gas ejected from the conduit 30 in an attached connector conduit (not shown). The mixing structure shown is exemplary in nature only. Other appropriate structures (or no structure at all) can be employed, as desired.

The water jacket sleeve 32 is integrally formed with and surrounds the exhaust gas conduit 30. One end of the sleeve 32 forms a portion 40 of the top surface of the flange 34. The other end (i.e. the outlet side) of the sleeve 32 terminates at a location back from the outlet end of the conduit 30, such that the conduit extends past the end of the sleeve 32. The distance that the conduit 30 extends past the end of the sleeve 32 is sufficient to ensure the cooling water and exhaust gases are mixed well within the connector conduit (not shown). The inlet of the connector conduit interfaces with the outlet side of the sleeve 32. Typically, the connector sleeve is a rubber tube which surrounds a portion of the outlet side of the sleeve 32 and is sealed thereto via any appropriate conventional means, such as a hose clamp. The outlet end of the sleeve 32 may also include a support 42 which interfaces with the exhaust gas conduit 30 so as to support the conduit and maintain it in approximately a concentric relationship with the sleeve 32. This concentric relationship between the conduit 30 and sleeve 32 is preferably maintained over the entire length of the riser elbow. The conduit 30 and sleeve 32 are held in a concentric relationship at the inlet side of the riser elbow by the structure of the flange 34. Thus, the flange 34 and the support 42 could be relied on to maintain the desired concentricity. However, if additional assurance is desired, the support 42 can be extended further into the cooling water channel 38. The support 42 could even be extended all the way to the flange 34.

The structure of the flange can be best seen in FIG. 2B. The bottom portion 33 of the flange 34 has a centrally located inlet 44 which interfaces with the exhaust gas outlet from the exhaust manifold (not shown) of the engine. This inlet 44 extends through the bottom flange portion 33 and transitions into the exhaust gas passageway formed by the conduit 30. The inlet 44 is surrounded by slots. FIG. 2B shows two, almost semicircular slots 46. However, a greater number of slots could also be employed, or even a single slot if desired, The slots 46 extend through the bottom flange portion 33 and open up into the cooling water channel 38.

Materials appropriate for use in forming the FRCMC exhaust gas conduit (including the bottom flange portion) of a marine engine riser elbow according to the present invention are generally made by combining a pre-ceramic polymer resin, such as silicon-carboxyl resin sold by Allied Signal under the trademark BLACKGLAS or alumina silicate resin (commercially available through Applied Poleramics under the product description CO2), with some type of fibers. Examples of types of fibers which might be employed in an FRCMC material include alumina, Nextel 312, Nextel 440, Nextel 510, Nextel 550, silicon nitride, silicon carbide, HPZ, graphite, carbon, and peat. To add toughness to the material, the fibers being incorporated into the FRCMC material are preferably first coated to a few microns thickness with an interface material such as carbon, silicon nitride, silicon carbide, silicon carboxide, boron nitride or multiple layers of one or more of these interfacial materials. The interface material prevents the resin from adhering directly to the fibers of the fiber system. Thus, after the resin has been converted to a ceramic, there is a weak interface between the ceramic matrix and the fibers. This weak bond enhances the ductility exhibited by the FRCMC material. In addition, the FRCMC material can include filler materials preferably in the form of powders having particle sizes somewhere between about 1 and 100 microns. These filler material can include one or more of the following materials: silicon carbide, alumina, silicon nitride, silica, or other ceramic powders. The resin, fiber, and possibly filler material mixture is generally formed into the shape of the desired structure via one of a variety of methods and heated for a time to a temperature, as specified by the material suppliers, which causes the resin to be converted into a ceramic.

The fibers and interface materials incorporated into the FRCMC material provide ductility to the FRCMC structure. Ductility is the measure of how much strain the structure can withstand before fracturing or tearing. This ductility gives the FRCMC structure the strength to withstand the rigors of general handling and thermally-induced strains associated with the widely varying temperature environment of the marine engine's exhaust system. However, the degree of ductility necessary to prevent a failure of the FRCMC structure will vary depending on the type of marine engine involved and the particular application in which it is to be employed. Thus, it can be desirable to tailor the degree of ductility exhibited by the FRCMC material. The tailoring process is a subject of a patent application entitled CERAMIC COMPOSITE MATERIALS HAVING TAILORED PHYSICAL PROPERTIES, having the same inventors as the present application and assigned to a common assignee. This application has a filing date of Oct. 14, 1998, and is assigned Ser. No. 09/172,361.

An example of tailoring the ductility of the FRCMC material used in a marine engine riser elbow in accordance with the present invention is shown by the case where enough fibers to make up between about 25 to 55 percent of the volume of the structure are incorporated. This amount of fiber produces a ductility within a range of about 0.10 to 0.55 percent strain, where the lower the fiber volume is within the range, the lower the resulting ductility. The types of fibers which can be employed to produce the desired degree of ductility are any of those mentioned previously, or any combination of those fibers.

Another characteristic of the FRCMC material which is of interest in the design of the exhaust gas conduit is the thermal conductivity exhibited by the material, as this will partially dictate the cooling requirements of the engine. The thermal conductivity can be tailored to some extent by the choice of fibers and/or the incorporation of certain filler materials.

Generally, the above-described tailoring involves incorporating the appropriate type of fibers into the composite in sufficient quantities to produce the desired degree of a characteristic, such as the exhibited ductility and/or thermal conductivity. Additionally, the tailoring can involve incorporating the appropriate types of filler material into the composite in sufficient quantities to produce the desired degree of thermal conductivity. In both cases, the degree to which these respective characteristics are exhibited varies with the type and percent by volume of fibers and filler materials incorporated into the structure. The ductility exhibited by a FRCMC material can also be tailored by selecting the form of the fibers. Namely, selecting either a continuous or a non-continuous configuration. A continuous fiber configuration corresponds to woven fiber systems where the individual fibers typically run the entire length of the FRCMC structure. Whereas, non-continuous fiber configurations are associated with loose fibers which often terminate within the structure itself. Fibers in a continuous fiber configuration will produce a higher-degree of ductility than will a non-continuous fiber configuration. Finally, it is noted that the choice of interface material can have an effect on the degree of ductility exhibited by the FRCMC material.

However, there can be a tradeoff involved in the tailoring process. Generally, the greater the amount of some types of fibers in the FRCMC material, the greater its thermal conductivity. If it is desired to limit the thermal conductivity to a desired level, this can be accomplished by restricting the amount of fibers making up the FRCMC material. This will, of course, also limit the degree of ductility that can be imparted to the composite by the fibers. However, if the amount of fibers incorporated into the FRCMC material has to be limited in order to achieve a desired thermal conductivity to the point that the necessary ductility would not be achieved, the ductility can still be enhanced by choosing the types of fibers, the form of the fibers, and the interface materials which will produce the maximum degree of ductility. In this way, it may be possible to obtained both the desired thermal conductivity and ductility using the same amount of fibers. If the approach is taken to select the type of fibers which will ensure the desired degree of ductility, the impact of the type of fibers on the thermal conductivity of the composite must also be considered in choosing the fibers. Generally, the use of ceramic fibers will minimize the thermal conductivity of the FRCMC material, as opposed to, for example, carbon fibers which would tend to increase the thermal conductivity. Thus, it is preferred that ceramic fibers be chosen when it is desired to both enhance the ductility and to minimizing thermal conductivity.

Another approach that could be taken to tailor the thermal conductivity of the FRCMC material involves the addition of an appropriate filler material. This approach would provide a second way of obtaining the desired thermal conductivity, while at the same time employing the amount, type, and form of fibers (and interface material) which would ensure the desired ductility is also achieved.

Forming the exhaust gas conduit from FRCMC materials also has another advantage in addition to those described above. FRCMC materials in their raw state prior to curing and pyrolization can be formed into complex shapes. For example, the exhaust gas conduit according to the present invention has an aggressive bend that can exceed 90 degrees and a flange. In addition, the mixing structure at the outlet of the conduit which can be quite intricate, such as the one depicted in FIG. 2A.

As for the water jacket sleeve, this portion of the riser elbow is preferably formed of a low cost, injection-moldable plastic which can withstand long-term exposure to up to about 250 degree Fahrenheit salt water without structural degradation. In addition, this plastic should have a ductility sufficient to withstand typical handling and thermally-induced strains associated with the riser elbow. For example, many conventional thermosetting plastics will exhibit the desired qualities and so would be suitable for forming the sleeve 32.

Generally, the method for constructing the riser elbow according to the present invention involves first making the FRCMC exhaust gas conduit, and then forming the water jacket sleeve around the FRCMC conduit. The FRCMC conduit is preferably made by an injection molding process.

Figure 3:
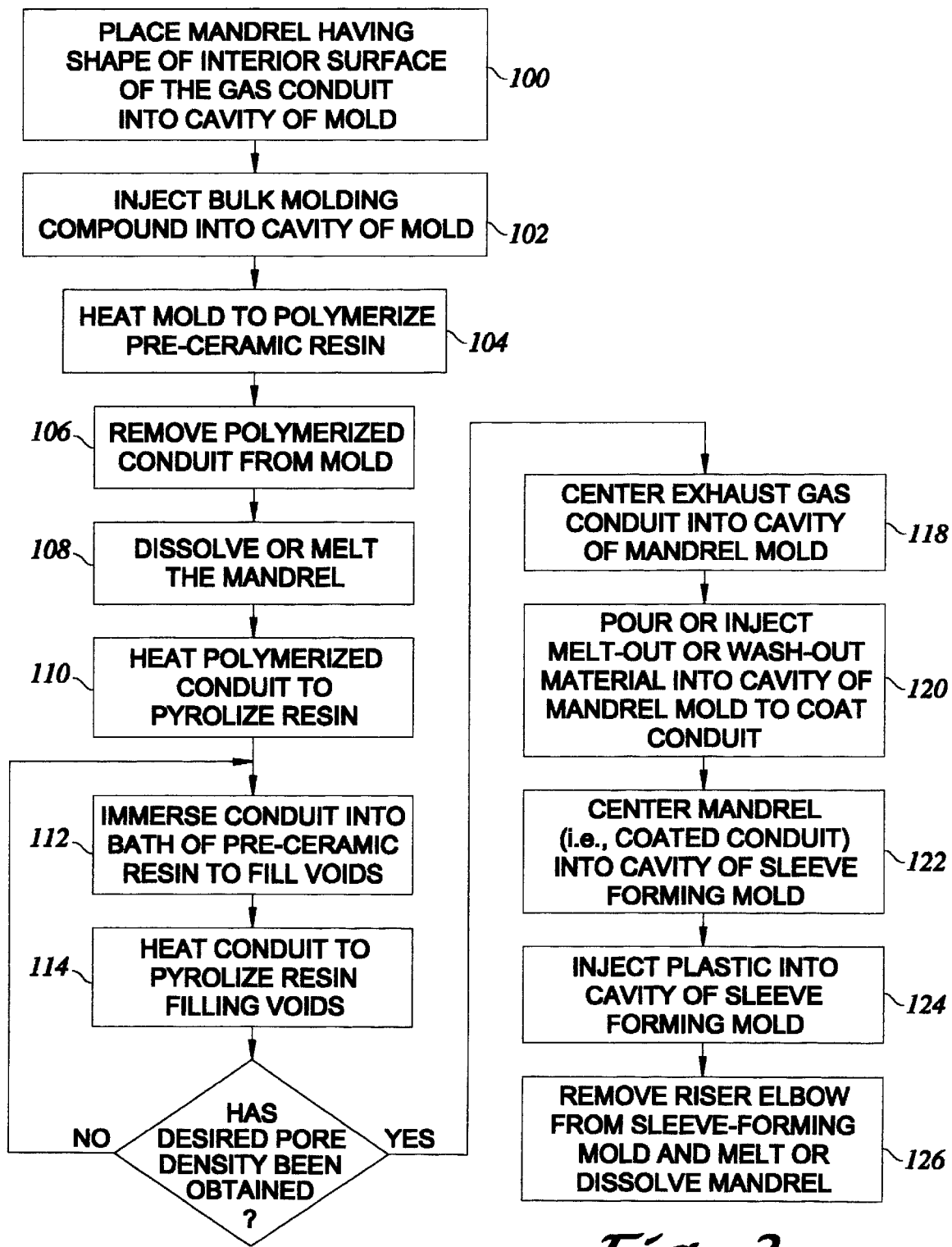
FIG. 3 is a block diagram of a method for forming the riser elbow of FIGS. 2A and 2B.

As described below and summarized in FIG. 3, injection molding generally entails the steps of:

(a) Placing a melt-out or washout-type mandrel having the shape of the interior surface of the exhaust gas conduit including the centrally located inlet of the bottom flange portion of the conduit into a cavity of a mold (step 100). The cavity of the mold has the shape of the exterior of the conduit and bottom flange portion.

(b) Injecting a quantity of bulk molding compound into a cavity of a mold (step 102) using the methods and an injection apparatus as disclosed in a co-pending application entitled COMPRESSION/INJECTION MOLDING OF POLYMER-DERIVED FIBER REINFORCED CERAMIC MATRIX COMPOSITE MATERIALS having some of the same inventors as the present application and assigned to a common assignee. This co-pending application was filed on Feb. 28, 1996 and assigned Ser. No. 08/704,348. The disclosure of this co-pending application is hereby incorporated by reference. The bulk molding compound is a mixture which includes the above-described pre-ceramic resin, non-continuous "chopped" fibers, and possibly filler materials.

(c) Heating the mold at a temperature and for a time associated with the pre-ceramic resin which polymerizes the resin to form a fiber-reinforced polymer composite structure (step 104).

(d) Removing the polymerized composite structure from the mold (step 106).

(e) Dissolving the mandrel if it is of a washout type, or melting it if it is of the melt-out type, as appropriate (step 108).

(f) And, heating the polymerized composite structure at a temperature and for a time associated with the polymerized resin which pyrolizes it to form a FRCMC structure (step 110).

Once the FRCMC part is molded via the injection molding process, it is preferred that an additional procedure be performed to eliminate pores created during the required heating cycles. Eliminating these pores strengthens the part. Specifically, after the completion of the heating step which pyrolizes the FRCMC part, the part is immersed into a bath of a pre-ceramic resin to fill the pores (step 112). The part is then heated at a temperature and for a time associated with the resin filling the pores so as to transform it to a ceramic material (step 114). Unfortunately, the process of heating the resin filling the pores will create further pores. Accordingly, it is desired that the filling and heating steps be repeated until the pore density within the FRCMC part is less than a prescribed percentage by volume. This prescribed percentage corresponds to the point where the part will exhibit a repeatable strength from one part to the next. It is believed five iterations of the filling and firing process are required to obtain this repeatable part strength. To facilitate the filling step, it is preferred that the resin has a water-like viscosity. In addition, the FRCMC part could be placed in a vacuum environment to assist in the filling of the pores.

Figure 1:
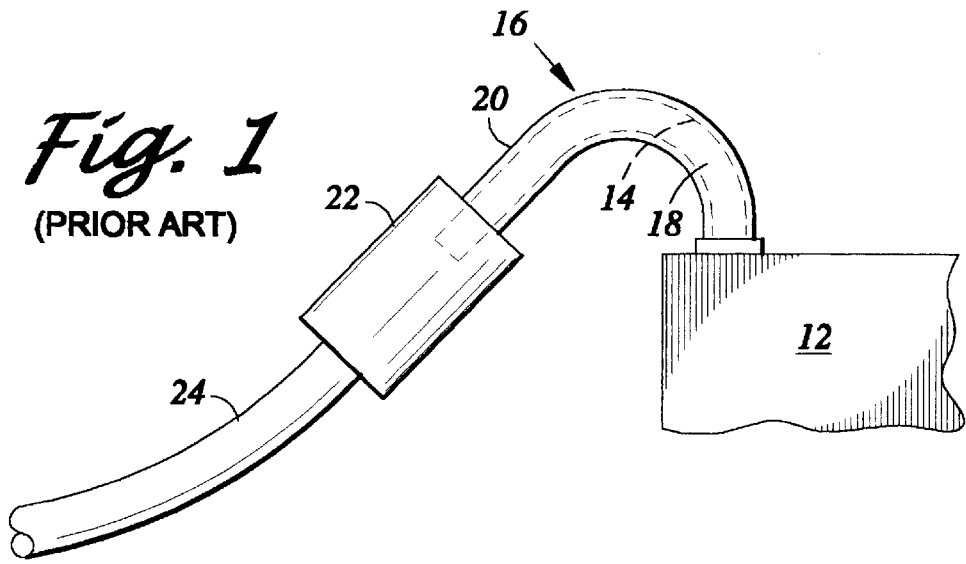
FIG. 1 is a simplified diagram of a portion of an exhaust system of a marine engine.
Figure 4:
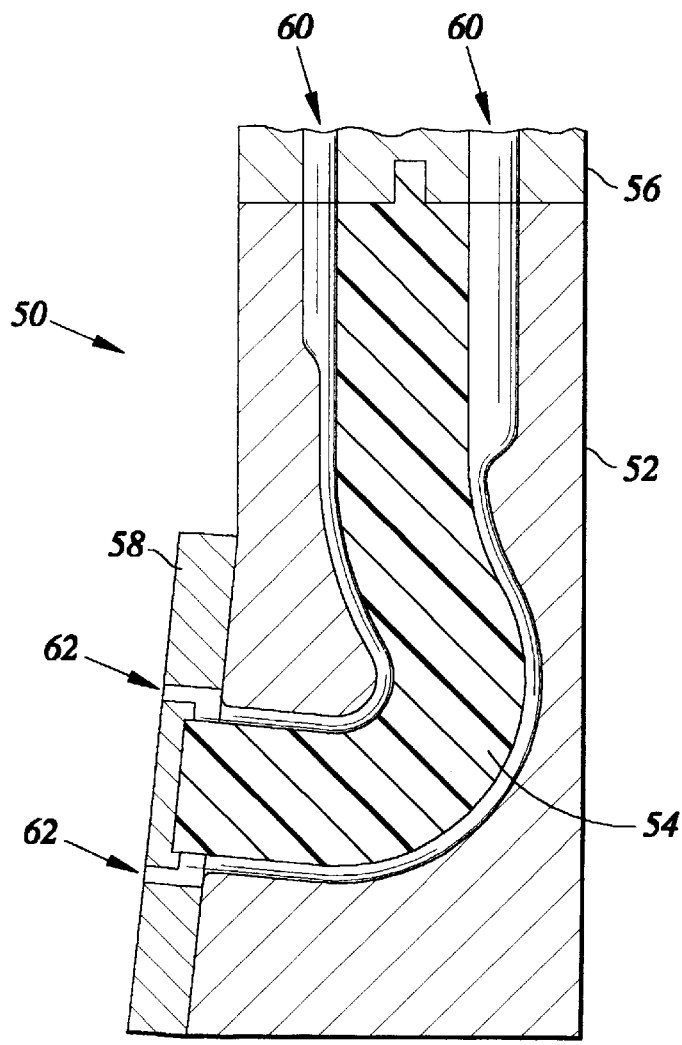
FIG. 4 is a cross-sectional view of an injection mold capable of molding the exhaust gas conduit portion of the riser elbow of FIGS. 2A and 2B.

A simplified example of a mold 50 which can be used to form the FRCMC exhaust gas conduit by the above-described injection molding process is shown in FIG. 4. The mold 50 includes two half-side pieces 52 (one of which is shown) surrounding a curved mandrel 54. The mandrel 54 has an exterior surface corresponding to the dimensions of the interior surface of the exhaust gas conduit, and is either a washout type mandrel, or a melt-out type (for example one made of wax or plastic). The wash-out type mandrel is removed after the conduit has been formed by dissolving it via conventional methods (step 108 of FIG. 3), such as with a high pressure water jet. A melt-out type mandrel, on the other hand, is removed once the conduit is formed by melting it (step 108 of FIG. 3). The two half-side pieces 52 together form an internal surface corresponding to the dimensions of the exterior surface of the conduit. Accordingly, the side portions 52 and mandrel 54 define the mold's internal volume which has the shape of the exhaust gas conduit being formed. There are also two end plates 56, 58 which support the mandrel 54 within the cavity formed by the side pieces 52. The mold's internal volume is connected to a series of sprue conduits 60 in the end plate 56 which interfaces with the injection molding apparatus (not shown). The other end plate 58 contains a series of resin outlet ports 62 to allow excess resin to escape during the molding process.

With the mold 50 closed and sealed, the bulk molding compound is injected and the FRCMC part is formed. The entire mold 50 is then heated to polymerize the resin of the bulk molding compound. The mold 50 is disassembled to release the polymerized conduit structure, and the mandrel is then dissolved or melted, as appropriate, prior to pyrolizing the exhaust gas conduit.

The FRCMC exhaust gas conduit structure can also be fabricated using other methods applicable to FRCMC part formation including resin transfer molding, hot pressing, tape or tow placement, or hand lay-up. However, it is not intended to limit the invention to any of the described methods. Rather any appropriate method may be employed to form the structure from the previously described FRCMC material.

Once the FRCMC exhaust gas conduit and bottom flange structure has been formed, the water jacket sleeve is formed around the structure. Preferably, this is accomplished using an injection molding process similar to that described above. In this case, the mandrel used to form the interior surface of the sleeve is the previously-formed exhaust gas conduit and flange structure itself, with a coating made from either a wash-out or melt-out material. Referring once again to FIG. 3, the mandrel is prepared by the centering the FRCMC structure into a mold having a cavity corresponding to the shape of the interior wall of the water jacket sleeve (step 118). Washout or melt-out type material is them poured or injected into the mold and hardened via conventional methods (step 120). The coated FRCMC structure is then centered in the cavity of a separate mold (step 122). The cavity of this second mold corresponds to the shape of the external surface of the sleeve (step 122). The mold is closed and the aforementioned plastic is injected into the mold cavity to form the sleeve (step 124). The riser elbow is removed from the mold and the melt-out or wash-out material filling the cooling water channel is melted or dissolved, as the case may be, to complete the forming process (step 126).

While the invention has been described in detail by reference to the preferred embodiment described above, it is understood that variations and modifications thereof may be made without departing from the true spirit and scope of the invention. For example, the water jacket sleeve was formed of a plastic material. This was done to reduce the cost of manufacturing the riser elbow according to the present invention, as the suggested plastic materials are relatively inexpensive compare to other materials. However, where cost is not a factor, more exotic sleeve structures can be employed. One possibility is a sleeve made from FRCMC material. This sleeve would be formed at the same time as the exhaust gas conduit using a modified injection mold. A riser elbow made completely of FRCMC material would have the advantage of eliminating the previously-described manufacturing steps associated forming a plastic sleeve. However, the material costs associated with making the sleeve of FRCMC may outweigh any savings resulting from an abbreviated manufacturing process. Another possibility is to make the sleeve from a fiber reinforced organic matrix composite. The result would be a sleeve that could exhibit significantly improved strength and ductility. However, once again the material cost could exceed that of the plastic, and it is not believed the improved strength and ductility are necessary.

Wherefore, what is claimed is:

1. A corrosion-resistant, thermally insulative riser elbow for a marine engine, comprising an exhaust gas conduit having a generally uniformly fiber-reinforced single layer wall structure with a non-brittle interior surface and fabricated of fiber reinforced ceramic matrix composite (FRMC) material formed from a polymer-derived ceramic resin in its ceramic form and fibers.

2. The riser elbow of claim 1, further comprising a water jacket sleeve formed integrally with and surrounding the exhaust gas conduit so as to define a cooling water channel between an outer wall of the exhaust gas conduit and an inner wall of the water jacket sleeve.

3. The riser elbow of claim 2, wherein an outlet side of the water jacket sleeve terminates at a location back from the termination point of an outlet side of the exhaust gas conduit, thereby causing the exhaust gas conduit to extend past the end of the water jacket sleeve.

4. The riser elbow of claim 2, wherein the exhaust gas conduit has a flange portion at an inlet side thereof, said flange portion having a centrally located opening which is in correspondence with an exhaust gas passageway formed by the interior of the exhaust gas conduit and which is interfaceable with an exhaust gas outlet of the marine engine.

5. The riser elbow of claim 4, wherein the flange portion of the exhaust gas conduit further comprises at least one peripheral opening adjacent the centrally located opening, said at least one peripheral opening being in correspondence with the cooling water channel and interfaceable with a cooling water outlet of the marine engine.

6. The riser elbow of claim 1, wherein the exhaust gas conduit comprises a cooling water mixing structure formed on the outside of the conduit at an outlet end thereof.

7. The riser elbow of claim 2, further comprising a support structure formed within the cooling water channel to support and maintain a concentric relationship between the exhaust gas conduit and the water jacket sleeve.

8. The riser elbow of claim 1 wherein the polymer-derived ceramic resin is chosen from silicon-carboxyl resin, or alumina silicate resin.

9. The riser elbow of claim 1 wherein the fibers comprise at least one of alumina, Nextel 312, Nextel 440, Nextel 510, Nextel 550, silicon nitride, silicon carbide, HPZ, graphite, carbon, and peat.

10. The riser elbow of claim 1, wherein the degree of ductility is selectable and varies with the percentage by volume and quantity of the fibers in the FRCMC material.

11. The riser elbow of claim 10, wherein the percentage by volume of the FRCMC material consisting of the fibers is within a range of about 25 to 55 percent, so as to produce a degree of ductility between about 0.10 to 0.55 percent strain.

12. The riser elbow of claim 10, wherein the form of the fibers incorporated into the FRCMC material has at least one of a continuous configuration and a non-continuous configuration, said fiber form also affecting the degree of ductility exhibited, and wherein the fiber form employed is chosen to, in combination with the quantity of fibers, produce the desired degree of ductility.

13. The riser elbow of claim 1, wherein the fibers are coated with an interface material which increases the degree of ductility exhibited by the FRCMC material.

14. The riser elbow of claim 13 wherein the interface material comprises at least one 0.1–5.0 micron thick layer of at least one of carbon, silicon nitride, silicon carbide, and boron nitride.

15. The riser elbow of claim 1, wherein the FRCMC material further comprises a filler material which increases the thermal insulating capability of the material.

16. The riser elbow of claim 15, wherein the filler material comprises a ceramic powder.

17. The riser elbow of claim 15, wherein the filler material comprises at least one of silicon carbide, alumina, and silicon nitride.

18. The riser elbow of claim 15, wherein the degree of thermal insulation provided by the filler material is selectable and varies with the percentage by volume of the structure consisting of the filler material.

19. The riser elbow of claim 2, wherein the water jacket sleeve comprises a plastic material capable of withstanding long-term exposure to at least 250 degree Fahrenheit salt water without structural degradation.

20. The riser elbow of claim 19, wherein the plastic material further has sufficient ductility to withstand handling and thermally-induced strains associated with the riser elbow of a marine engine.

21. The riser elbow of claim 20, wherein the plastic material comprises a thermosetting plastic material.

22. A method for forming a corrosion-resistant, thermally insulative riser elbow for a marine engine, comprising the step of:

forming an exhaust gas conduit comprising fiber reinforced ceramic matrix composite (FRCMC) material derived from a polymer-derived ceramic resin in its ceramic form and fibers generally directly adjacent each other.

23. The method of claim 22, further comprising the step of forming a water jacket sleeve integrally with and surrounding the exhaust gas conduit so as to define a cooling water channel between an outer wall of the exhaust gas conduit and an inner wall of the water jacket sleeve.

24. The method of claim 23, wherein the step of forming the exhaust gas conduit comprises forming a flange portion at an inlet side of the conduit, said flange portion having a centrally located opening which is in correspondence with an exhaust gas passageway formed by the interior of the exhaust gas conduit and which is interfaceable with an exhaust gas outlet of the marine engine.

25. The method of claim 24, wherein the step of forming the flange portion of the exhaust gas conduit comprises forming at least one peripheral opening adjacent the centrally located opening, said at least one peripheral opening being in correspondence with the cooling water channel and interfaceable with a cooling water outlet of the marine engine.

26. The method of claim 22, wherein the step of forming the exhaust gas conduit comprises the steps of:

(a) placing a mandrel having the shape of the interior surface of the conduit into a cavity of a mold, said cavity having the shape of the exterior of the conduit;

(b) injecting a quantity of bulk molding compound into the cavity of the mold, said bulk molding compound comprising a pre-ceramic resin and fibers;

(c) heating the mold at a temperature and for a time associated with the pre-ceramic resin which polymerizes the resin to form a fiber-reinforced polymer composite conduit;

(d) removing the polymerized composite conduit from the mold;

(e) removing the mandrel; and (f) firing the polymerized composite conduit for a temperature and for a time associated with the polymerized resin which pyrolizes it.

27. The method of claim 26, further comprising upon the completion of step (e), the steps of:

(f) immersing the conduit containing pores formed during firing into a bath of a pre-ceramic resin to fill the pores;

(g) heating the conduit at a temperature and for a time associated with the resin filling said pores so as to transform it to a ceramic material;

(h) repeating steps (f) and (g) until the pore density within the exhaust gas conduit is less than a prescribed percentage by volume.

28. The method of claim 26, wherein the mandrel comprises a melt-out material and the step of removing the mandrel comprises melting it.

29. The method of claim 26, wherein the mandrel comprises a washout material and the step of removing the mandrel comprises dissolving it.

30. The method of claim 23, wherein the step of forming the water jacket sleeve comprises the steps of:

(a) centering the exhaust gas conduit in a cavity of a mold, said cavity corresponding to the dimensions of an interior wall of the water jacket sleeve;

(b) introducing one of a melt-out or wash-out material into the cavity of the mold so as to coat the exhaust gas conduit and form a mandrel;

(c) centering the mandrel into a cavity of a second mold, said second mold cavity corresponding to the dimensions of the exterior surface of the water jacket sleeve;

(d) injecting a plastic material into the cavity of the second mold;

(e) removing the riser elbow from the second mold; and (f) one of (i) removing the melt-out material by melting it, or (ii) removing the wash-out material by dissolving it.

31. The method of claim 30, wherein the plastic material is capable of withstanding long-term exposure to at least 250 degree Fahrenheit salt water without structural degradation.

* * * * *